July 24, 1923.
T. H. THOMAS
FLUID PRESSURE BRAKE
Filed June 3, 1919
1,463,026
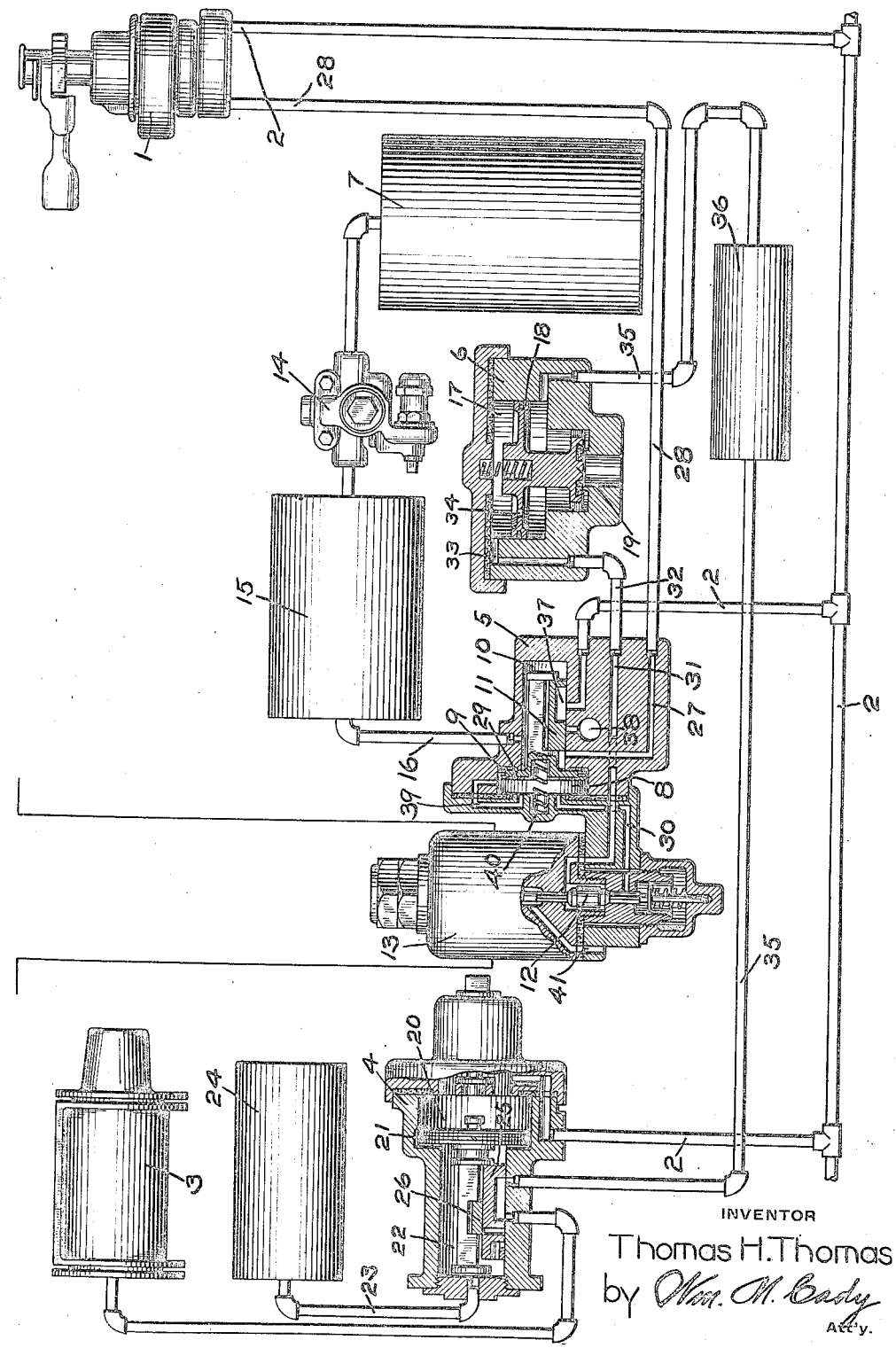
INVENTOR
Thomas H. Thomas
by Wm. M. Cady
Att'y.

Patented July 24, 1923.

1,463,026

UNITED STATES PATENT OFFICE.

THOMAS H. THOMAS, OF EDGEWOOD, PENNSYLVANIA, ASSIGNOR TO WESTINGHOUSE AIR BRAKE COMPANY, OF WILMERDING, PENNSYLVANIA, A CORPORATION OF PENNSYLVANIA.

FLUID-PRESSURE BRAKE.

Application filed June 3, 1919. Serial No. 301,513.

*To all whom it may concern:*

Be it known that I, THOMAS H. THOMAS, a citizen of the United States, residing at Edgewood, in the county of Allegheny and State of Pennsylvania, have invented new and useful Improvements in Fluid-Pressure Brakes, of which the following is a specification.

This invention relates to a brake equipment adapted to be operated from a remote point for controlling the train.

It has been proposed to provide a train controlling system, such as that disclosed in the prior patent of Walter V. Turner, No. 1,339,680, dated May 11, 1920, in which a train is brought to a loading station under the usual control of the engineer. At the loading station, the train is stopped by the operation of track circuits, under the control of an operator at a designated point, through the action of apparatus on the locomotive, which is adapted to control the application and release of the brakes and power for running the train.

The principal object of my invention is to provide an improved remote controlled locomotive apparatus of the above character.

In the accompanying drawing, the single figure is a diagrammatic view, partly in section, of a remote controlled locomotive apparatus embodying my invention.

As shown in the drawing, the locomotive apparatus may comprise a brake valve device 1 of the usual construction, a brake pipe 2, a brake cylinder 3, a triple valve device 4, an application valve device 5 adapted to be controlled from a remote point, a quick release valve device 6, and a main reservoir 7.

The application valve device 5 may comprise a casing having a piston chamber 8 containing piston 9 and a valve chamber 10 containing a slide valve 11.

The fluid pressure in piston chamber 8 is controlled by a double beat valve 12 adapted to be operated by a magnet 13 which is controlled by the operation of a track device under the control of an operator located at a remote point.

Fluid under pressure is supplied to the valve chamber 10 from main reservoir 7 at a reduced pressure, according to the adjustment of the feed valve device 14, an additional volume reservoir 15 being interposed in the supply pipe 16 for the purpose of securing more gradual variations in pressure on the feed valve device and its consequent more satisfactory operation.

The quick release valve device 6 may comprise a casing having a piston chamber 17 containing a piston 18 for operating a release valve 19.

The triple valve device 4 may comprise a casing having a piston chamber 20 connected to the brake pipe 2 and containing the usual piston 21 and a valve chamber 22 connected by pipe 23 to the auxiliary reservoir 24 and containing a main slide valve 25 and a graduating slide valve 26 adapted to be operated by piston 21.

The triple valve device 4 controls the brakes on the locomotive, according to variations in brake pipe pressure and the train brakes are also controlled by variations in brake pipe pressure in the usual manner.

In operation, fluid under pressure is supplied from the main reservoir 7 through the feed valve device 14 at a reduced pressure to the reservoir 15 and thence to valve chamber 10 of the application valve device 5.

Fluid then flows from valve chamber 10, the valve 11 being in release position, as shown in the drawing, through passage 27 and pipe 28 to the brake valve 1 and with the brake valve in running position, fluid is then supplied to the brake pipe 2, so as to charge the brake system throughout the train with fluid under pressure.

Fluid also flows through a restricted port 29 in piston 9 to the piston chamber 8 and normally, the magnet 13 being energized, the double beat valve 12 holds passage 30 closed, so that the pressure in piston chamber 8 equalizes with the pressure in valve chamber 10.

The engineer handles the train in the usual manner until he arrives at a loading station where the tower operator assumes control of the train. In order to stop the train, the tower operator, through the track circuits, causes the deenergization of magnet 13, which then operates to shift the double beat valve 12 so as to connect passage 30 with a passage 31, which leads through pipe 32 and passage 33 to piston chamber 17 of the release valve device 6. Thence fluid from piston chamber 8 flows through a port 34 in piston 18 to the opposite side of the piston and through pipe 35 to a timing reservoir 36 which is normally at atmospheric pressure.

The reduction in pressure in piston chamber 8 then causes the fluid pressure in valve chamber 10 to shift the piston 9 and slide valve 11 to application position, in which the brake pipe 2 is vented through cavity 37 to exhaust port 38.

The brake pipe pressure is thus reduced to cause an application of the brakes on the train in the usual manner and also operates the triple valve device 4 on the locomotive to supply fluid from the auxiliary reservoir 24 to the brake cylinder 3.

The movement of slide valve 11 also cuts off communication from valve chamber 10 to the pipe 28, so that the brakes cannot be released by operation of the brake valve 1.

The application valve device is held in application position until the pressure in the valve chamber 10 equalizes with the pressure in the timing reservoir, and to permit a more rapid equalization of pressures, in addition to the equalizing port 29, a by-pass 39 is provided, which is adapted in the application position of piston 9 to connect opposite sides of the piston, so that after a short predetermined time, the fluid pressures having equalized on opposite sides of piston 9, the spring 40 will return the piston 9 and slide valve 11 to release position, in which communication is again established from valve chamber 10 through pipe 28 to the brake valve 1. The brake valve being in running position, the brake pipe 2 is recharged with fluid under pressure so as to cause the release of the brakes on the train and the movement of the triple valve piston 21 on the locomotive to release position.

The brakes on the locomotive, however, are not released by the movement of the triple valve device 4 to release position, so long as the magnet 13 remains deenergized, since the exhaust port of the triple valve is connected through pipe 35, the release valve device 6 and passage 31 with the double beat valve 12, which, with magnet 13 deenergized, cuts off communication from passage 31 to exhaust port 41.

When it is desired to shift the train along in order to load another car, the tower operator operates the track circuits so as to cause the energization of magnet 13, which operates the double beat valve 12 to cut off communication from the timing reservoir 36 to piston chamber 8 of the application valve device and to connect passage 31 with exhaust port 41.

The pressure acting in piston chamber 17 of the release valve device 6 is then vented to the atmosphere, so that the pressure in the timing reservoir 36 acts on the opposite side of the piston 18, so as to operate the piston and open the release valve 19. Fluid is thereupon quickly vented from the timing reservoir to the atmosphere and also from the locomotive brake cylinder 3, so that the brakes will be released on both the train and the locomotive, permitting the train to be moved forward.

The above operation of alternately applying and releasing the brakes may be effected under the control of the tower man as often as it is desired to shift the train at the loading station.

Having now described my invention, what I claim as new, and desire to secure by Letters Patent, is:—

1. In a remote controlled fluid pressure brake, the combination with an application valve device comprising a piston normally subject on opposite sides to fluid under pressure and valve means operated by said piston for effecting an application of the brakes, of a timing reservoir, a magnet controlled valve for venting fluid from one side of said piston to said timing reservoir to effect the movement of the piston to application position, and a by-pass adapted to be opened in the application position of the piston for quickly equalizing the fluid pressures on opposite sides of the piston.

2. In a remote controlled fluid pressure brake, the combination with an application valve device for effecting an application of the brakes, of a timing reservoir, a release valve device, and a magnet operated valve having one position for venting fluid from said application valve device through the release valve device to the timing reservoir and another position for venting fluid from the release valve device to an exhaust port.

3. In a remote controlled fluid pressure brake, the combination with a brake pipe, triple valve device, and an application valve device operated upon a reduction in fluid pressure therein for venting fluid from the brake pipe, of a timing reservoir connected to the exhaust port of the triple valve device, a release valve device, and magnet controlled valve means having one position for venting fluid from said release valve device to an exhaust port for operating said release valve device to vent fluid from said timing reservoir.

In testimony whereof I have hereunto set my hand.

THOMAS H. THOMAS.